United States Patent
Lee

(10) Patent No.: US 8,208,754 B2
(45) Date of Patent: Jun. 26, 2012

(54) APPARATUS AND METHOD FOR REDUCING IMAGE NOISE WITH FILTER MATRIX AND COMPUTER READABLE MEDIUM STORED THEREON COMPUTER EXECUTABLE INSTRUCTIONS FOR PERFORMING THE METHOD

(75) Inventor: Young-Sin Lee, Seoul (KR)

(73) Assignee: Core Logic Inc., Seoul (KR)

( * ) Notice: Subject to any disclaimer, the term of this patent is extended or adjusted under 35 U.S.C. 154(b) by 1080 days.

(21) Appl. No.: 12/152,008

(22) Filed: May 12, 2008

(65) Prior Publication Data
US 2008/0298709 A1 Dec. 4, 2008

(30) Foreign Application Priority Data
May 11, 2007 (KR) .......... 10-2007-0046026

(51) Int. Cl.
*G06K 9/40* (2006.01)
*G06K 9/00* (2006.01)

(52) U.S. Cl. ......... 382/275; 382/232; 382/264; 382/298

(58) Field of Classification Search .......... 382/232–253, 382/264, 265, 275, 298
See application file for complete search history.

(56) References Cited

U.S. PATENT DOCUMENTS

| | | | | |
|---|---|---|---|---|
| 7,103,214 B2 * | 9/2006 | Kusakabe et al. | ............. | 382/162 |
| 7,103,229 B2 * | 9/2006 | Porikli | ............. | 382/275 |
| 2006/0251330 A1 * | 11/2006 | Toth et al. | ............. | 382/236 |

FOREIGN PATENT DOCUMENTS

| | | |
|---|---|---|
| JP | 11-317943 | 11/1999 |
| JP | 2000-106630 | 4/2000 |
| JP | 2005-229491 | 8/2005 |
| KR | 10-0126462 | 10/1997 |
| KR | 10-2005-0102805 | 10/2005 |

* cited by examiner

*Primary Examiner* — Wesley Tucker
(74) *Attorney, Agent, or Firm* — The Nath Law Group; Joshua B. Goldberg; Jerald L. Meyer

(57) ABSTRACT

An apparatus for reducing image noise with filter matrix comprises a first input unit for receiving input of an object image data for conversion; a second input unit for receiving input of a size data of a convention area; a first output unit for setting conversion unit matrixes movable in the conversion area in a predetermined direction relative to a standard matrix; a second output unit for outputting average values of image information of pixels corresponding to the conversion unit matrixes set by first output unit and outputting an average value of image information of pixels corresponding to the standard matrix; an arrangement unit for calculating difference values between the average value of the standard matrix and the average values of the conversion unit matrixes and arranging calculation (difference) values according to size; and a conversion unit for low-pass filtering the conversion unit matrixes having calculation values smaller than a predetermined ordinal number among the arranged calculation values.

15 Claims, 2 Drawing Sheets

(a)　　　　　　　　(b)

APPARATUS AND METHOD FOR REDUCING IMAGE NOISE WITH FILTER MATRIX AND COMPUTER READABLE MEDIUM STORED THEREON COMPUTER EXECUTABLE INSTRUCTIONS FOR PERFORMING THE METHOD

CLAIM OF PRIORITY

This application claims priority under 35 USC §119(a) to Korean Patent Application No. 10-2007-0046026, filed on May 11, 2007, in the Korean Intellectual Property Office, the entire contents of which are hereby incorporated by reference.

TECHNICAL FIELD

The present invention relates to apparatus and method for reducing noise of an input image, and in particular, to apparatus and method for reducing noise of an image through filtering based on a correlation between pixels or matrixes including pixels.

BACKGROUND

Human beings use various channels and media to obtain information. Among sense organs of a human body, the eye plays the most important role as an entrance for perceiving and receiving information. According to statistics, it is known that about 70% of the perceived and received information is obtained through a sense of vision among the human senses (vision, hearing, smell, taste and touch).

In the past, the perceived and received information was generally transmitted through a medium of letter. However, with a rapid development of computers and transmission media, image information by an image media holds the most important part as an object and subject in information communications of a modern society.

As information communication techniques develop in an aspect of hardware, various techniques also develop to transmit image information more rapidly and effectively. And, many methods are disclosed to satisfy various objects of image processing.

The image processing includes feature extraction, image enhancement, image restoration, image reconstruction, image analysis, image recognition and image compression. In particular, in recent days, the image processing has a main interest in a method for reducing noise that may occur during image compression and processing involved in transmission of image information or during transmission of image information.

Various methods were introduced to reduce noise according to purpose and utility, however conventionally noise reduction was performed only in consideration of simple average or deviation of pixels adjacent to an object pixel for noise reduction.

The conventional method considers a uniform and statistical methodology without reflecting a correlation or relationship between pixels. This results in a simple and easy calculation process, but vulnerability against loss of main characteristics (hue, location, edge and so on) of an image.

And, the conventional method uniformly uses simple average value and location information of adjacent pixels, and as a result, incidental errors may continuously occur during a calculation process and further noise may occur even after application of an algorithm.

Synthetically judging, in most cases, the conventional method does not consider information of a pixel of an image, such as brightness, hue, edge or location when reducing noise or a false color of the image, and thus has a disadvantage of loss of the above-mentioned information.

Further, in the case that a digital image is generated using various contemporary digital cameras and mobile phones on the market, various erroneous information may occur to image information, for example noise occurring in setting a high ISO (International Standards Organization) value to increase sensitivity in a dark environment, noise caused by excessive compression or noise occurring due to dust of a lens or sensor (CMOS (Complementary Metal Oxide Semiconductor) or CCD (Charged Coupled Device)). Therefore, it requires to reduce noise and minimize the loss of a unique information of an image.

In a modern society, an image device is increasingly implemented in a portable and small-sized equipment rather than in an advanced equipment. A conversion device based on a complicated frequency has limitations in image processing due to the restricted size and speed of hardware. Therefore, it needs a method that requires a small-sized hardware resource to apply an embedded system or a chip to an image processing apparatus integrated into a portable terminal and can overcome the above-mentioned problems.

SUMMARY

The present invention was devised to solve the above-mentioned problems. An object of the present invention is to provide apparatus and method for reducing image noise that perform a simple logical calculus and can maintain effectively a unique information of an image.

And, another object of the present invention is to provide a computer readable medium stored thereon computer executable instructions for performing the above-mentioned method.

These and other features, aspects, and advantages of the present invention will be more fully described in the preferred embodiments of the present invention. And, the objects and advantages of the present invention can be implemented by configurations recited in the claims singularly or in combination.

To achieve the above-mentioned objects, an apparatus for reducing image noise with filter matrix comprises a first input unit for receiving input of an object image data for conversion; a second input unit for receiving input of an area data, namely, a size data of a conversion area of the image data; a first output unit for setting conversion unit matrixes movable in the conversion area in a predetermined direction relative to a standard matrix, namely, a reference matrix for conversion; a second output unit for outputting average values of image information of pixels corresponding to the conversion unit matrixes set by first output unit and outputting an average value of image information of pixels corresponding to the standard matrix; an arrangement unit for calculating difference values between the average value of the standard matrix and the average values of the conversion unit matrixes and arranging the calculation (difference) values according to size; and a conversion unit for low-pass filtering the conversion unit matrixes having calculation values smaller than a predetermined ordinal number among the arranged calculation values.

Through the above-mentioned configuration, the apparatus for reducing noise may be incorporated, in which correlation between object matrixes for conversion is reflected.

Preferably, the image information is at least one image information selected from the group consisting of Y, Cb and Cr, and the predetermined direction includes upper, lower, left and right directions.

Through the above-mentioned elements, the apparatus can use the image information variously according to system environment and improve the efficiency of calculation.

And, preferably the arrangement unit multiplies the average value of each conversion unit matrix by a weight value that varies according to a spaced distance of the conversion unit matrix from the standard matrix and calculates the difference values in average value between the standard matrix and the conversion unit matrixes based on the resultant values, and the weight value is determined by the following equation:

$$\frac{N-m}{(N-1)!}$$

(N is an area data, namely, a size data of the conversion area, and m is a spaced distance of the conversion unit matrix from the standard matrix).

Through the above-mentioned configuration, the apparatus can improve a correlation between object matrixes for conversion.

Further, the standard matrix and the conversion unit matrix each is a 3×3 matrix, and preferably the location of the standard matrix is set by moving the standard matrix in the image data by the its size in the direction of row or column. Through the above-mentioned configuration, the apparatus can maximize the efficiency in calculation time and maintenance of image information.

Meanwhile, a method for reducing image noise with filter matrix according to another aspect of the present invention comprises a first input step for receiving input of an object image data for conversion; a second input step for receiving input of an area data, namely, a size data of a conversion area of the image data; a first output step for setting conversion unit matrixes movable in the conversion area in a predetermined direction relative to a standard matrix, namely, a reference matrix for conversion; a second output step for outputting average values of image information of pixels corresponding to the set conversion unit matrixes and an average value of image information of pixels corresponding to the standard matrix; an arrangement step for calculating difference values between the average value of the standard matrix and the average values of the conversion unit matrixes and arranging the calculation (difference) values according to size; and a conversion step for low-pass filtering the conversion unit matrixes having calculation values smaller than a predetermined ordinal number among the arranged calculation values.

Through the above-mentioned configuration, the method for reducing image noise may be incorporated, in which a correlation between object matrixes for conversion is reflected.

BRIEF DESCRIPTION OF THE DRAWINGS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Prior to the detailed description of the present invention, terms or definition necessary to understand the present invention are described.

Generally, a color space of an image, essential to image processing may be expressed variously, for example RGB (Red, Green, Blue), CMYK (Cyan, Magenta, Yellow, Key (Black)), HS-family, CIE (The Commission Internationale d'Eclairage) or Y-family, according to point of view such as view toward color mixture or similarity to a visual system of human beings, and may be converted to another kind of color space by a simple mathematical conversion formula.

And, an input image includes a plurality of pixels, and each pixel has its unique image information (brightness, hue, saturation and so on). Generally, the image information has values of 0 to 255 and is indicated as information of 8 bit. However, in alternative embodiments, the image information may be indicated as information of 10 bit or 12 bit depending on application conditions.

Therefore, it should be understood that a color space coordinate system used as an example in the present invention may be applicable to another color space coordinate equally or similarly, and a bit size of an image information of a pixel in the input image is just an example of the present invention for description.

Figure 1:
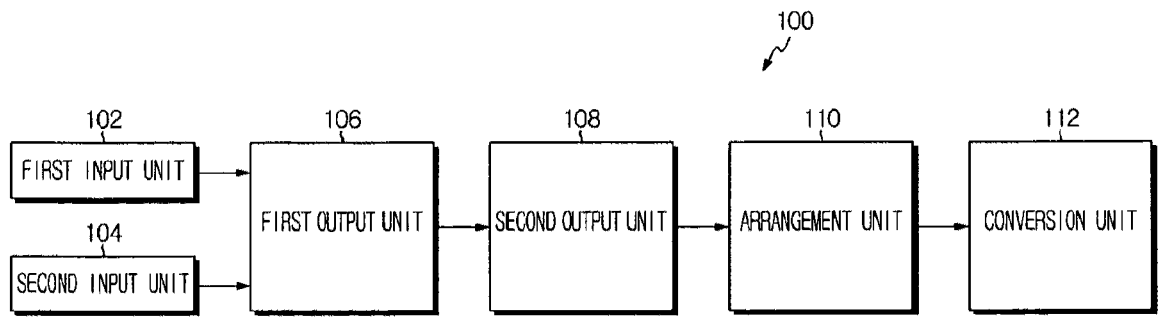
FIG. 1 is a block diagram illustrating an apparatus for reducing image noise with filter matrix according to a preferred embodiment of the present invention.
Figure 2:
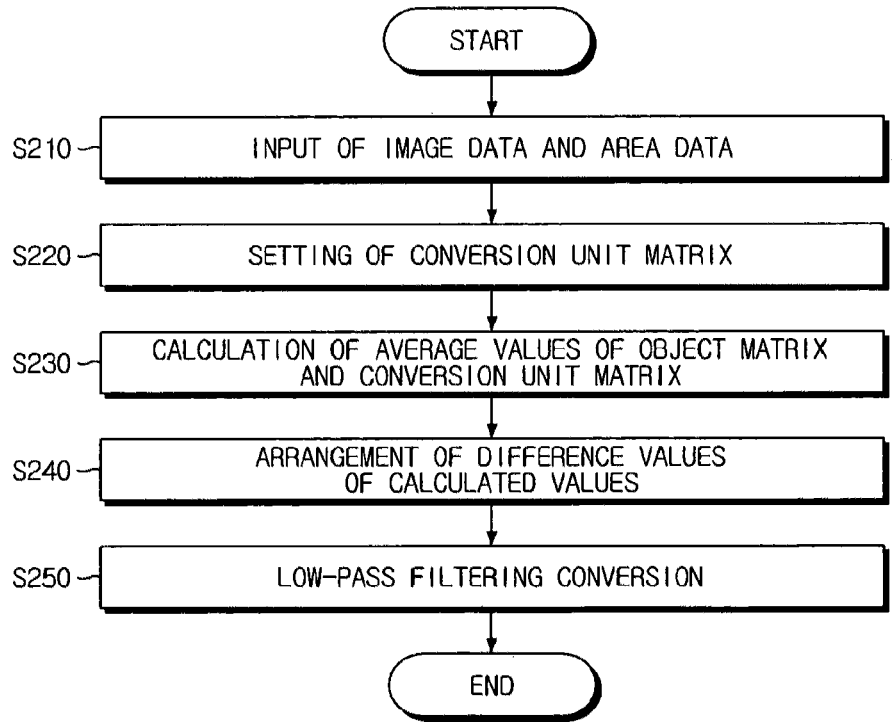
FIG. 2 is a flow chart illustrating a method for reducing image noise with filter matrix according to a preferred embodiment of the present invention.

FIG. 1 is a block diagram illustrating an apparatus for reducing image noise with filter matrix according to a preferred embodiment of the present invention, and FIG. 2 is a flow chart illustrating a method for reducing image noise with filter matrix according to a preferred embodiment of the present invention.

Referring to FIGS. 1 and 2, the apparatus 100 for reducing image noise with filter matrix according to the present invention comprises a first input unit 102, a second input unit 104, a first output unit 106, a second output unit 108, an arrangement unit 110, and a conversion unit 112.

First, the first input unit 102 receives input of an object image data for conversion (S210). As mentioned above, the input image may be an image of various color spaces, however an image of YCbCr is used as an example of the present invention for description.

And, the second input unit 104 receives input of an area data, namely, a size data of a conversion area of the image data (S210). The first output unit 106 sets a conversion unit matrix movable in the conversion area in a predetermined direction relative to a standard matrix, namely, a reference matrix for conversion (S220).

Hereinafter, configurations of the first input unit 102, second input unit 104 and first output unit 106 are described in detail through the following Table 1.

TABLE 1

| a11 | a12 | a13 | a14 | a15 | a16 | a17 | a18 | a19 |
|---|---|---|---|---|---|---|---|---|
| a21 | a22 | a23 | a24 | a25 | a26 | a27 | a28 | a29 |
| a31 | a32 | a33 | a34 | a35 | a36 | a37 | a38 | a39 |
| a41 | a42 | a43 | a44 | a45 | a46 | a47 | a48 | a49 |
| a51 | a52 | a53 | a54 | a55 | a56 | a57 | a58 | a59 |
| a61 | a62 | a63 | a64 | a65 | a66 | a67 | a68 | a69 |
| a71 | a72 | a73 | a74 | a75 | a76 | a77 | a78 | a79 |
| a81 | a82 | a83 | a84 | a85 | a86 | a87 | a88 | a89 |
| a91 | a92 | a93 | a94 | a95 | a96 | a97 | a98 | a99 |

The above Table 1 shows a portion of the input image inputted into the first input unit 102, and the area data inputted into the second input unit 104 means a size of an area dotted in the Table 1 and is generally a natural number.

In other words, the number of pixels located in upper, lower, left and right directions relative to a55 pixel centered in the Table 1 may be a natural number, however various variations or modifications may be made depending on internal calculation relationship.

For a specific example, in the case that the area data, namely, a size data of the conversion area is N, the conversion area has a size of N in upper, lower, left and right directions relative to the a55 pixel, i.e. a whole size of (2N+1)×(2N+1).

Nine pixels (a44, a45, a46, a54, ..., a66) located in a central portion of the Table 1 constitute a standard matrix, namely, a reference matrix for conversion. A size of the standard matrix may be settable according to environment of a system or apparatus or calculation efficiency. Hereinafter, assuming that the standard matrix is a 3×3 matrix of the most preferable size and the input area data is '3', description is made as follows.

The conversion unit matrix has the same size as the standard matrix and is movable in the input area (shown in dotted line).

The "predetermined direction" includes upper, lower, left, right, upper left, upper right, lower left and lower right directions, and means a direction that the conversion unit matrix can move relative to the standard matrix.

Specifically, in the case that the predetermined direction is an upper direction, the conversion unit matrix is as the following Table 2.

TABLE 2

| a34 | a35 | a36 | a24 | a25 | a26 |
|---|---|---|---|---|---|
| a44 | a45 | a46 | a34 | a35 | a36 |
| a54 | a55 | a56 | a44 | a45 | a46 |

The conversion unit matrix may be formed by moving a matrix having the same size as the standard matrix in the upper direction in the conversion area. The number of conversion unit matrixes is limited by the size of the input area, and thus as shown in the above Table 2, two conversion unit matrixes may be formed in the input area.

The following Tables 3, 4 and 5 show examples of conversion unit matrixes in the case that the predetermined direction is lower, left and right directions, respectively.

TABLE 3

| a54 | a55 | a56 | a64 | a65 | a66 |
|---|---|---|---|---|---|
| a64 | a65 | a66 | a74 | a75 | a76 |
| a74 | a75 | a76 | a84 | a85 | a86 |

TABLE 4

| a43 | a44 | a45 | a42 | a43 | a44 |
|---|---|---|---|---|---|
| a53 | a54 | a55 | a52 | a53 | a54 |
| a63 | a64 | a65 | a62 | a63 | a64 |

TABLE 5

| a45 | a46 | a47 | a46 | a47 | a48 |
|---|---|---|---|---|---|
| a55 | a56 | a57 | a56 | a57 | a58 |
| a65 | a66 | a67 | a66 | a67 | a68 |

The predetermined direction may be eight directions including all of upper, lower, left, right and four diagonal directions. The direction may be inputted by a user or be preset in the form of storage in the apparatus 100. The predetermined direction may be at least one direction selected from the above-mentioned eight directions. The whole number of conversion unit matrixes may be determined by function relationship according to direction, size of the conversion area or size of the standard matrix.

In consideration of maintenance of image information including an edge in an image and calculation efficiency, it is preferable to set the predetermined direction to four directions including upper, lower, left and right directions. When general characteristics of an image are considered, the more directions are selected, the edge information such as an edge is reflected more precisely. However, as direction increases, calculation process and time increase accordingly. Assuming that the edge information is maintained, it is the most preferable to set the predetermined direction to four directions in function relationship according to calculation time as mentioned above.

After the above-mentioned step is completed, the second output unit 108 of the present invention outputs average values of image information of pixels corresponding to the set conversion unit matrixes and an average value of image information of pixels corresponding to the standard matrix (S230).

For convenience of description, conversion unit matrixes of upper, lower, left and right directions are referred to as M1, M2, M3, M4, M5, M6, M7 and M8, respectively, and the standard matrix is referred to as M0.

The second output unit 108 outputs average values of the nine matrixes of M0, M1, ..., M8, and the average value means an average value of image information of pixels corresponding to each matrix. Hereinafter, the average values of M0, M1, M2, ..., M8 are referred to as Av0, Av1, Av2, ... and Av8, respectively.

And, the image information is at least one image information selected from the group consisting of Y, Cb and Cr.

It should be understood that the image information of various color spaces may be converted by a simple mathematical equation, and thus the image information expressed in various manners is included in the scope of the present invention.

The image information may be selected on the basis of information to be mainly maintained. Various variations or modifications may be made depending on statistical characteristics, and it should be understood that, if the average value is a statistical calculation value having a statistical meaning as an average value of each matrix, the average value is included in the scope of the present invention.

If at least two image information are selected, an RMS (Root Mean Square) value of each image information may be used as the average value.

After the average values of the conversion unit matrixes and the average value of the standard matrix are outputted as mentioned above, the arrangement unit 110 of the present invention calculates difference values between the average values of the conversion unit matrixes and the average of the standard matrix, and arranges the calculation values according to size (S240).

That is, the arrangement unit 110 calculates the following values.

|Av0-Av1|=A1, |Av0-Av2|=A2, |Av0-Av3|=A3, |Av0-Av4|=A4, |Av0-Av5|=A5, |Av0-Av6|=A6, |Av0-Av7|=A7, |Av0-Av8|=A8

Then, the arrangement unit 110 arranges the values of A1, A2, . . . , A8 according to size. For example, in the case that the values are arranged in ascending order, i.e. in the order of A2, A3, A6, A1, A5, A7, A8 and A4, the M2 matrix corresponding to the A2 value has a largest difference value with the standard matrix.

A matrix having the largest difference value has the most definite difference in image characteristics with the standard matrix, and includes pixels corresponding to an important edge in an image of an object that is generally taken a picture.

Thus, when a filtering process for reducing noise is performed, the matrix having the above-mentioned image characteristics is excluded from the filtering process, so that noise is reduced while effectively maintaining information such as an edge.

In other words, there is a high possibility that a matrix having a large difference in average value with the standard matrix includes many pixels having different characteristics from those of the standard matrix. Thus, a low-pass filtering to be mentioned below is performed on the other matrixes except such a matrix, so that information corresponding to the edge can be maintained.

After the above-mentioned arrangement step is completed, the conversion unit 112 of the present invention low-pass filters conversion unit matrixes corresponding to calculation values smaller than a predetermined ordinal number among the arranged calculation values (S250). The predetermined ordinal number is set by a user or by a set point of the apparatus or system, and may be applicable adjustably according to utility environment or image characteristics.

The low-pass filtering uses a low pass filter, and besides may use the other filter such as Median, Gaussian, Laplacian of Gaussian or Difference of Gaussian. Various variations or modifications may be made to realize the technical spirit of the present invention.

As mentioned above, in the conversion step of the conversion unit 112, except an area having high distinctness with the standard matrix, a filtering process is selectively performed on only a matrix with high similarity to the standard matrix, i.e. an area having not too large image characteristics. As a result, an important factor of image information is effectively maintained and unnecessary information such as noise is reduced.

And, to improve a correlation between object matrixes, the arrangement unit 112 may multiply the average value of each conversion unit matrix by a weight value that varies according to a spaced distance of the conversion unit matrix from the standard matrix, and calculate a difference of the average value based on the resultant value.

In the case that a conversion unit matrix is spaced far away from the standard matrix, the conversion unit matrix is provided with a small weight value, and in the case that a conversion unit matrix is spaced close to the standard matrix, the conversion unit matrix is provided with a large weight value. The arrangement unit 112 may be configured to reflect a correlation according to a spaced distance from the standard matrix when arranging the calculation values.

And, preferably the weight value is determined by the following equation.

$$\frac{N-m}{(N-1)!}$$

In the above equation, N is an area data, namely, a size data of the conversion area, and m is a spaced distance of the conversion unit matrix from the standard matrix.

For a specific example, in the case that the input value, N is '4', a conversion unit matrix spaced as much as a pixel from the standard matrix is multiplied by a weight value of the following equation:

$$\frac{4-1}{(4-1)!} = \frac{3}{3 \times 2 \times 1} = \frac{1}{2}$$

a conversion unit matrix spaced as much as two pixels from the standard matrix is multiplied by a weight value of the following equation:

$$\frac{4-2}{(4-1)!} = \frac{2}{3 \times 2 \times 1} = \frac{1}{3}$$

a conversion unit matrix spaced as much as three pixels from the standard matrix is multiplied by a weight value of the following equation:

$$\frac{4-3}{(4-1)!} = \frac{1}{3 \times 2 \times 1} = \frac{1}{6}$$

The average value of each conversion unit matrix is multiplied by a corresponding weight value as mentioned above, and the resultant values are arranged, so that a weight value according to a spaced distance from the standard matrix is reflected on the calculation.

In the case that the predetermined direction is set to diagonal directions, a spaced distance between pixels is not a natural number, and thus it may raise fractions not lower than 0.5 to a unit at a predetermined place of decimals.

To improve effect of a calculation rate, the standard matrix used in the present invention may be set by movement as much as row and column corresponding to its size.

In other words, as shown in the above Table 1, in the case that the standard matrix is a 3×3 matrix including a55 pixel at the center, after a series of steps are completed, a next standard matrix is a 3×3 matrix including a58 pixel at the center, and after a step for a single row is completed, a next row is $8^{th}$ row that is moved as much as 3 pixels from a previous row, $5^{th}$ row.

Figure 3:
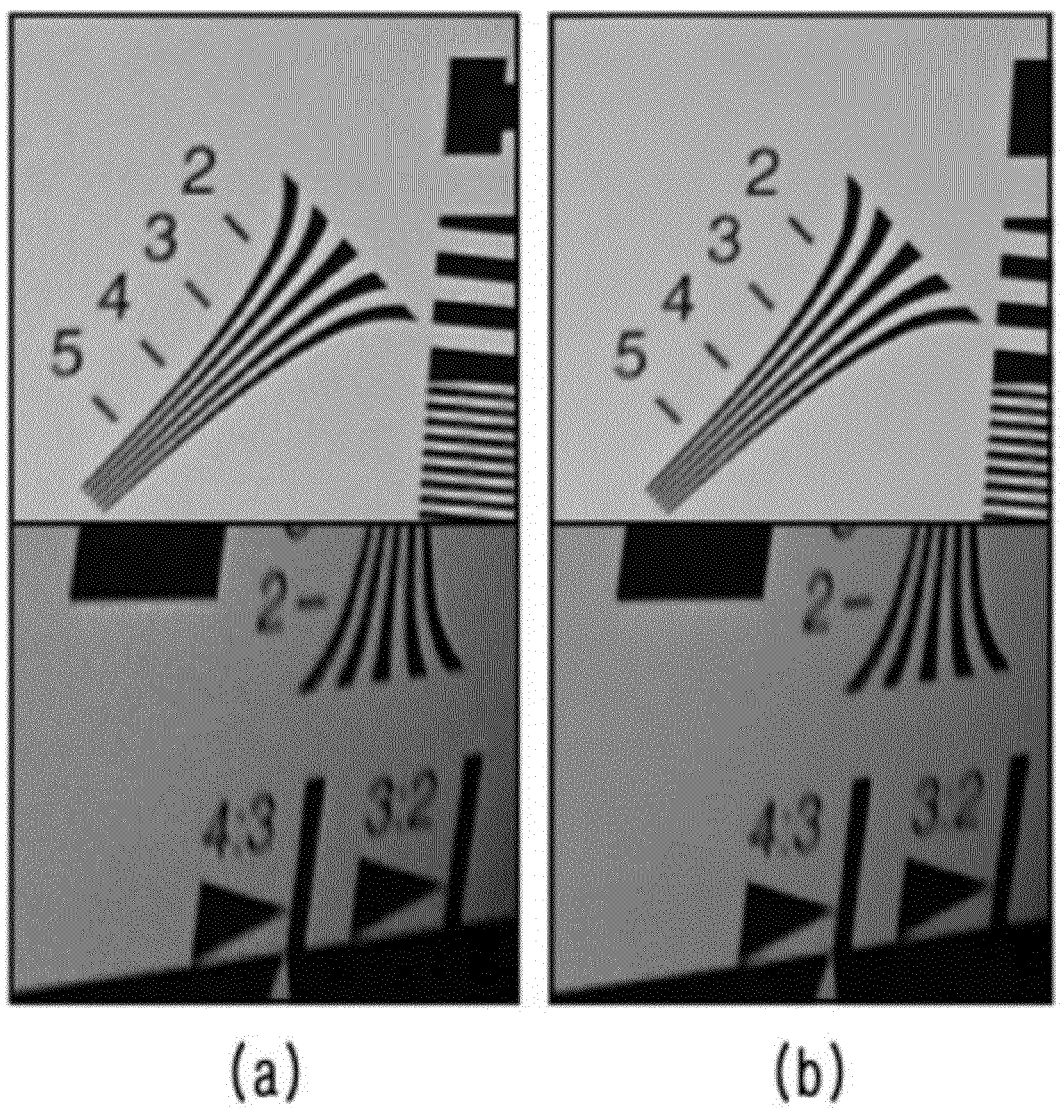
FIG. 3 is a view illustrating results of image data converted by the present invention.

FIG. 3 is a view illustrating results of the image data converted by the present invention.

In FIG. 3, (a) shows an image before processing, and (b) shows an image applied by the apparatus and method for reducing image noise with filter matrix according to the present invention.

The method for reducing image noise with filter matrix according to the present invention may be incorporated as a computer readable code in a computer readable medium. The computer readable medium includes all kinds of storage devices for storing data readable by a computer system. For example, the computer readable medium is ROM, RAM, CD-ROM, a magnetic tape, a floppy disc or an optical data storage device, and may be incorporated in the form of a carrier wave (for example, transmission via the Internet). And, the computer readable medium may store and execute a code that is dispersed in computer systems connected to each other via a network and is readable by a computer through a dispersion method. Further, function program, code and code segments for implementing the method for reducing image noise with filter matrix may be easily inferred by programmers in the prior art.

Only a few implementations and examples are described and other implementations, enhancements and variations can be made based on what is described and illustrated in this application.

The apparatus and method for reducing image noise with filter matrix according to the present invention creates an effect of reducing effectively noise included in an image through a simple logical calculus and can maintain a main information of the image.

That is, the present invention can provide apparatus and method which reduces noise by reflecting an unique attenuate of a pixel of an image to minimize the loss of information about visual characteristics, specially edge or hue of the corresponding pixel and an image including the corresponding pixel and to achieve the sharpness improvement and edge enhancement.

Further, the above-mentioned method can produce an optimum effect on an apparatus difficult to apply a large hardware source, such as a portable terminal.

What is claimed is:

1. An apparatus for reducing image noise with filter matrix, comprising:
   a first input unit for receiving input of an object image data for conversion;
   a second input unit for receiving input of a size data of a conversion area of the image data;
   a first output unit for setting conversion unit matrixes that are movable in the conversion area in a predetermined direction relative to a standard matrix, namely, a reference matrix for conversion;
   a second output unit for outputting average values of image information of pixels corresponding to the conversion unit matrixes set by first output unit and outputting an average value of image information of pixels corresponding to the standard matrix;
   an arrangement unit for calculating difference values between the average value of the standard matrix and the average values of the conversion unit matrixes and arranging the calculated difference values according to size; and
   a conversion unit for low-pass filtering the conversion unit matrixes having difference values smaller than a predetermined ordinal number among the arranged difference values.

2. The apparatus for reducing image noise with filter matrix according to claim 1,
   wherein the image information is at least one image information selected from the group consisting of Y, Cb and Cr.

3. The apparatus for reducing image noise with filter matrix according to claim 1,
   wherein the predetermined direction includes upper, lower, left and right directions.

4. The apparatus for reducing image noise with filter matrix according to claim 1,
   wherein the arrangement unit
      multiplies the average value of each conversion unit matrix by a weight value that varies according to a distance between the conversion unit matrix and the standard matrix to obtain a result for each conversion unit matrix, and
      calculates the difference values between the result obtained for the standard matrix and the results obtained for each conversion unit matrixes.

5. The apparatus for reducing image noise by edge tracking according to claim 4,
   wherein the weight value is determined by the following equation:

$$\frac{N-m}{(N-1)!}$$

where N is a size data of the conversion area, and m is a distance between a conversion unit matrix and the standard matrix.

6. The apparatus for reducing image noise with filter matrix according to claim 1,
   wherein the standard matrix and the conversion unit matrixes are 3×3 matrixes.

7. The apparatus for reducing image noise with filter matrix according to claim 1,
   wherein a location for a successive standard matrix is set by moving the standard matrix from a prior location in the image data by the size of the standard matrix such that the successive standard matrixes do not overlap in row or column.

8. A method for reducing image noise with filter matrix, comprising:
   a first input step for receiving input of an object image data for conversion;
   a second input step for receiving input of a size data of a conversion area of the image data;
   a first output step for setting conversion unit matrixes that are movable in the conversion area in a predetermined direction relative to a standard matrix, namely, a reference matrix for conversion;
   a second output step for outputting average values of image information of pixels corresponding to the conversion unit matrixes set by first output unit and outputting an average value of image information of pixels corresponding to the standard matrix;

an arrangement step for calculating difference values between the average value of the standard matrix and the average values of the conversion unit matrixes and arranging the calculated difference values according to size; and a conversion step for low-pass filtering the conversion unit matrixes having difference values smaller than a predetermined ordinal number among the arranged difference values.

9. The method for reducing image noise with filter matrix according to claim 8,
wherein the image information is at least one image information selected from the group consisting of Y, Cb and Cr.

10. The method for reducing image noise with filter matrix according to claim 8,
wherein the predetermined direction includes upper, lower, left and right directions.

11. The method for reducing image noise with filter matrix according to claim 8,
wherein, in the arrangement step,
the average value of each conversion unit matrix is multiplied by a weight value that varies according to a distance between the conversion unit matrix and the standard matrix to obtain a result for each conversion matrix, and
the difference values between the result obtained for the standard matrix and the results obtained for each conversion unit matrix is calculated.

12. The method for reducing image noise with filter matrix according to claim 11,
wherein the weight value is determined by the following equation:

$$\frac{N-m}{(N-1)!}$$

where N is a size data of the conversion area, and m is a distance between the conversion unit matrix and the standard matrix.

13. The method for reducing image noise with filter matrix according to claim 8, wherein the standard matrix and the conversion unit matrixes are 3×3 matrixes.

14. The method for reducing image noise with filter matrix according to claim 8,
wherein a location for a successive standard matrix is set by moving the standard matrix from a prior location in the image data by the size of the standard matrix such that the successive standard matrixes do not overlap in row or column.

15. A computer readable medium stored thereon computer executable instructions for performing the method defined in claim 8 or 14.

* * * * *